(12) United States Patent
Nochi et al.

(10) Patent No.: US 11,439,981 B2
(45) Date of Patent: Sep. 13, 2022

(54) CATALYST FOR HYDROLYSIS OF CARBONYL SULFIDE AND METHOD OF PRODUCING SAME

(71) Applicant: Mitsubishi Heavy Industries Engineering, Ltd., Kanagawa (JP)

(72) Inventors: Katsumi Nochi, Tokyo (JP); Masanao Yonemura, Tokyo (JP); Toshinobu Yasutake, Tokyo (JP); Kaori Yoshida, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 88 days.

(21) Appl. No.: 16/958,428

(22) PCT Filed: Nov. 30, 2018

(86) PCT No.: PCT/JP2018/044264
§ 371 (c)(1),
(2) Date: Jun. 26, 2020

(87) PCT Pub. No.: WO2019/138728
PCT Pub. Date: Jul. 18, 2019

(65) Prior Publication Data
US 2021/0060532 A1    Mar. 4, 2021

(30) Foreign Application Priority Data

Jan. 12, 2018   (JP) ............................. JP2018-003524

(51) Int. Cl.
| | | |
|---|---|---|
| *B01J 21/06* | (2006.01) | |
| *B01J 23/04* | (2006.01) | |
| *B01J 27/02* | (2006.01) | |
| *B01J 37/00* | (2006.01) | |
| *B01J 37/08* | (2006.01) | |
| *C10K 1/00* | (2006.01) | |
| *C10K 1/34* | (2006.01) | |

(52) U.S. Cl.
CPC ............ *B01J 21/063* (2013.01); *B01J 23/04* (2013.01); *B01J 27/02* (2013.01); *B01J 37/0018* (2013.01);
(Continued)

(58) Field of Classification Search
CPC . B01J 21/063; B01J 23/04; B01J 27/02; B01J 37/0018; B01J 37/08; B01J 37/0201;
(Continued)

(56) References Cited

U.S. PATENT DOCUMENTS

| | | |
|---|---|---|
| 4,422,958 A | 12/1983 | Dupin |
| 4,485,189 A | 11/1984 | Dupin |

(Continued)

FOREIGN PATENT DOCUMENTS

| | | |
|---|---|---|
| JP | S58-000248 A | 1/1983 |
| JP | H11-276897 A | 10/1999 |

(Continued)

OTHER PUBLICATIONS

International Search Report in corresponding International Application No. PCT/JP2018/044264, dated Feb. 5, 2019 (5 pages).
(Continued)

*Primary Examiner* — Anthony J Zimmer
*Assistant Examiner* — Logan Edward Laclair
(74) *Attorney, Agent, or Firm* — Osha Bergman Watanabe & Burton LLP

(57) ABSTRACT

A catalyst for COS hydrolysis includes titanium dioxide and a barium compound supported on the titanium dioxide. The catalyst, when expressing Ba and S in the catalyst in terms of BaO and $SO_3$, respectively, has a molar ratio of $SO_3$ to BaO of at least 1. The catalyst converts COS and $H_2O$ in a raw material gas to $CO_2$ and $H_2S$.

4 Claims, 1 Drawing Sheet

(52) U.S. Cl.
CPC ............... *B01J 37/08* (2013.01); *C10K 1/004* (2013.01); *C10K 1/34* (2013.01)

(58) Field of Classification Search
CPC ........ B01J 27/053; B01J 35/002; B01J 35/04; B01J 37/0009; C10K 1/004; C10K 1/34
See application file for complete search history.

(56) References Cited

U.S. PATENT DOCUMENTS

| | | | | |
|---|---|---|---|---|
| 4,532,119 | A | * | 7/1985 | Dupin ................ B01D 53/8615 423/230 |
| 6,858,562 | B1 | | 2/2005 | Takasu et al. |
| 2014/0369915 | A1 | | 12/2014 | Yonemura et al. |

FOREIGN PATENT DOCUMENTS

| JP | 2000-248286 A | 9/2000 |
|---|---|---|
| JP | 2013-173099 A | 9/2013 |
| JP | 2015-142917 A | 8/2015 |

OTHER PUBLICATIONS

Supplementary European Search Report issued in corresponding European Application No. 18899913.0, dated Nov. 20, 2020 (8 pages).

* cited by examiner ively adding a metal sulfate or a metal carbonate as a co-catalyst to be supported on anatase type titanium, and a method for hydrolyzing carbonyl sulfide in the presence of water and the catalyst in an atmosphere of a reducing gas is known (for example, Patent Document 1).

CITATION LIST

Patent Document

Patent Document 1: JP 11-276897A

With such a catalyst, the COS conversion rate for converting COS in the gas into H₂S is high immediately after use, but there is a problem that the COS conversion rate decreases with time of use.

SUMMARY OF INVENTION

In view of the above circumstances, an object of the present invention is to provide a catalyst for COS hydrolysis capable of maintaining a high COS conversion rate even after long use and a method of producing the same.

An aspect of the present invention is a catalyst for COS hydrolysis. The catalyst includes titanium dioxide and a barium compound supported on the titanium dioxide, where, when expressing Ba and S in the catalyst in terms of BaO and $SO_3$, respectively, the molar ratio of $SO_3$ to BaO in the catalyst is 1 or higher.

In one aspect of the present invention, the barium compound is preferably supported on the titanium dioxide in an amount of 2% by mass or greater and 8% by mass or less in terms of the barium oxide with respect to the catalyst.

In one aspect of the present invention, the molar ratio of $SO_3$ to BaO in the catalyst is preferably 2.1 or higher.

In one aspect, the present invention is a method of producing a catalyst for COS hydrolysis. The production method includes the steps of: adding a barium acetate solution to titanium dioxide containing a sulfate ion and performing kneading to obtain a kneaded product, extruding the kneaded product to obtain a molded catalyst, drying the molded catalyst, and calcining subsequent to the drying step to obtain a catalyst of titanium dioxide supporting a barium compound, where, when expressing Ba and S in the catalyst in terms of BaO and $SO_3$, respectively, the molar ratio of $SO_3$ to BaO in the catalyst being 1 or higher.

In one aspect of the present invention, in the step to obtain the kneaded product, the barium acetate solution is preferably added in an amount of 2% by mass or greater and 8% by mass or less in terms of the barium oxide with respect to the catalyst.

In one aspect of the present invention, the molar ratio of $SO_3$ to BaO in the catalyst is preferably 2.1 or higher.

The present invention provides a catalyst for COS hydrolysis capable of maintaining a high COS conversion rate even after long use and a method of producing the same.

DESCRIPTION OF EMBODIMENTS

Figure 1:
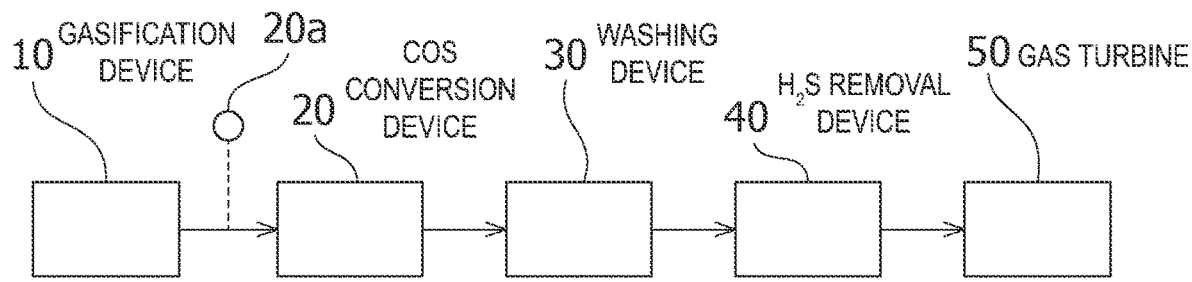
FIG. 1 is a conceptual figure for illustrating the structure and operating principle of a system for an embodiment in which the catalyst for hydrolysis of carbonyl sulfide according to the embodiment of the present invention is employed in an actual machine.

Hereinafter, embodiments of the catalyst for hydrolysis of carbonyl sulfide (COS) and the method of producing the same according to the embodiments of the present invention will be described in detail while referring to the attached drawings. The present invention is not limited by the embodiments described below. The accompanying drawings are for illustrating the overview of the present embodiment, and some of the attached devices are omitted.

1. Catalyst

Embodiments of the catalyst for COS hydrolysis according to the embodiment of the present invention will be described. The catalyst for COS hydrolysis according to the present embodiment includes at least a carrier and a barium compound supported on the carrier.

The carrier is titanium dioxide ($TiO_2$). Examples of the carrier include anatase type, rutile type, and brookite type titanium dioxide. Among these, from a practical viewpoint, the carrier is preferably an anatase type titanium dioxide. The specific surface area of the carrier may be, for example, from 30 to 300 m²/g. Additionally, the carrier may be a carrier capable of supporting a barium compound, and includes aluminum oxide ($Al_2O_3$) and zirconium oxide ($ZrO_2$).

The catalyst includes at least a barium compound. The amount of the barium compound may be any amount that can be supported on the carrier. For example, the amount is 1% by mass or greater, preferably 2% by mass or greater and 8% by mass or less, and more preferably 2% by mass or greater and 6% by mass or less in terms of a barium oxide (BaO) compound with respect to the catalyst. When the amount of the barium compound is in the range of 2% by mass or greater and 8% by mass or less with respect to the catalyst, the COS conversion rate can be improved by increasing the speed of converting the COS. In the present specification, it is intended that "barium oxide" indicates barium oxide as a compound, and "BaO" indicates BaO as a composition of a compound.

In addition, S content such as sulfate ion is present in the catalyst. Specifically, the catalyst contains at least a sulfate ion as an unavoidable or optional mixture before its production. In the present specification, it is mainly intended that "sulfate ion" indicates a sulfate ion ($SO_4^{2-}$), and "S content" indicates S as a composition constituting a compound such as a sulfate ion. It can be inferred that the sulfate ion is mixed in a trace amount into the carrier raw material before the production of the catalyst, generates sulfate during the process of producing the carrier raw material, and is present in the catalyst as barium sulfate. For example, titanium dioxide as a carrier raw material can be produced by treating ilmenite ore with sulfuric acid to produce titanium oxysulfate ($TiOSO_4$), followed by calcination. It can be inferred that the sulfate ion is adsorbed on titanium dioxide in the process of producing such a carrier raw material. Therefore, although a wide variety of structures can be inferred as the structure of the compound supported on the carrier on the catalyst surface, examples of the barium compound supported on the carrier described above include at least barium sulfate.

The molar ratio of $SO_3$ to BaO in the catalyst is 1.0 or higher, and preferably 2.1 or higher, when the S content in the catalyst is expressed in terms of the amount of $SO_3$. In addition, the amount of BaO can be obtained by converting the Ba content in the catalyst to the amount of BaO. When the mole ratio of $SO_3$ to BaO is 1.0 or higher, a sufficient barium compound such as barium sulfate ($BaSO_4$) is present, so that a high COS conversion rate can be maintained even when the catalyst is used for a long time. In the present specification, it is mainly intended that "$SO_3$" indicates $SO_3$ as a composition constituting a compound, and "Ba content" indicates a composition constituting a compound.

In addition, the catalyst may be a molded catalyst having a predetermined shape. The shape of the molded catalyst is spherical, plate-like, pellet shaped, and honeycomb shaped. Among these, the shape of the molded catalyst is preferably a honeycomb shape from a practical viewpoint. In addition, the molded catalyst may include a binder, an organic plasticizer to improve the moldability and strength thereof.

2. Production Method

An embodiment of the method of producing a catalyst for COS hydrolysis according to the present invention will be described. The catalyst for COS hydrolysis according to the present embodiment includes at least a kneading step, a molding step, a drying step, and a calcining step.

In the kneading step, barium acetate ($Ba(CH_3COO)_2$) aqueous solution, ammonia water ($NH_3$(aq)), a binder, and an organic plasticizer were added to the carrier raw material of titanium dioxide containing a sulfate ion, followed by kneading with a kneader such as a mixer to obtain a kneaded product. The shape of the carrier raw material is not particularly limited, but a powder shape is preferable. The concentration of the ammonia water may be, for example, from 5 to 15% by volume. The added amount of the ammonia water may be, for example, an amount such that the pH value of the solution before kneading is from 6 to 8. Examples of the binder include fibrous inorganic substances such as glass fiber, glass wool, rock wool, and kao wool, clay-based inorganic substances such as kaolin, halloysite, montmorillonite, sericite, montmorillonite, acid clay, bentonite, and combinations of these. Examples of the organic plasticizer include cellulose acetate and methyl cellulose.

The amount of the binder may be, for example, from 8 to 20% by mass with respect to the carrier raw material. The amount of the organic plasticizer may be, for example, from 5 to 10% by mass with respect to the carrier raw material.

With the catalyst that has undergone the kneading step, the molding step, the drying step, and/or the calcining step, as shown in Formula (I) below, barium acetate reacts with the sulfate ion contained in the carrier raw material to produce barium sulfate.

The added amount of the barium acetate solution may be any amount as long as the carrier can support the barium compound. For example, the amount is 1% by mass or greater, preferably 2% by mass or greater and 8% by mass or less, more preferably 2% by mass or greater and 6% by mass or less in terms of the amount of barium oxide with respect to the catalyst. When the added amount of the barium acetate solution is in the range of 2% by mass or more and 8% by mass or less with respect to the catalyst, the COS conversion rate can be improved by increasing the speed of converting the COS.

In the molding step, the kneaded product is extruded into a predetermined shape such as a honeycomb shape using an extruder such as a vacuum extruder equipped with a screw equipped with an extrusion nozzle to obtain a molded catalyst.

In the drying step, the molded catalyst is dried at a predetermined temperature and time. The temperature and time of the drying step may be any temperature and time at which the catalyst after the molding step can be dried. For example, the drying step may be performed at 80° C. to 110° C. for 60 to 300 minutes using a dryer.

In the calcining step, the barium compound is supported on the titanium dioxide by calcining the catalyst after the drying step at a predetermined temperature and time. The temperature of the calcining step is, for example, 400° C. or higher and 600° C. or lower. The time of the calcining step is, for example, 4 hours or more and 8 hours or less.

[Chemical Formula 1]

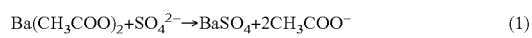

$$Ba(CH_3COO)_2 + SO_4^{2-} \rightarrow BaSO_4 + 2CH_3COO^- \qquad (1)$$

3. System

FIG. 1 illustrates a system that can suitably employ the catalyst for hydrolysis of carbonyl sulfide according to the present embodiment. According to the system illustrated in FIG. 1, using the catalyst according to the present embodiment, a fuel gas suitable for power generation by a gas turbine can be purified from a raw material gas obtained by gasifying coal.

As illustrated in FIG. 1, in a gasification device 10 such as a gasification furnace, coal is gasified under conditions where at least oxygen (02) is present, thereby forming a coal-gasified gas, which is a raw material gas. The raw material gas is sent to the COS conversion device 20 including the catalyst according to the present embodiment. In a COS conversion device 20, in the presence of the above-described catalyst, as represented by the following formula (II), COS and water ($H_2O$) in the gas are converted to carbon dioxide ($CO_2$) and hydrogen sulfide ($H_2S$). As a result, COS is decomposed and removed from the raw material gas. In the COS conversion device 20, the temperature measured by the thermometer 20a is adjusted to, for example, from 250° C. to 300° C., preferably 300° C.

[Chemical Formula 2]

$$COS + H_2O \leftrightarrow CO_2 + H_2S \qquad (II)$$

In addition, impurities such as halogen are mixed in the gas from which the COS has been removed. Impurities in the gas are removed by washing with, for example, water in a washing device 30 such as a water wash column. The gas that has passed through the washing device 30 contacts the amine absorption liquid of an aqueous solution of an alkanolamine, such as methyldiethanolamine ($C_5H_{13}NO_2$), in the $H_2S$ removal device 40, thereby absorbing and removing $H_2S$ in the gas into the absorption liquid. In the $H_2S$ removal device 40, $CO_2$ is also removed by absorption of carbon dioxide by the amine-absorbing liquid. The gas that has passed through the $H_2S$ removal device 40 is sent to the gas turbine 50 as a purified gas. The purified gas is mixed with compressed air, which has been compressed by a compressor (not illustrated), in the gas turbine 50 and burned. As a result, a high-temperature and high-pressure combustion gas is generated. The gas turbine drives the turbine by the combustion gas and drives a power generation means (not illustrated) to generate power.

EXAMPLES

The present invention will be described in further detail hereinafter with reference to examples. The catalyst for hydrolysis of carbonyl sulfide and the method of producing the same according to the present invention are not limited by the following examples.

1.1. Preparation of Catalyst

In Test Example 1, to 1000 g of titanium dioxide powder containing sulfate ion, a barium acetate solution (in an amount of 4% by mass in terms of barium oxide with respect to the catalyst), 10% by volume of ammonia water, 3% by mass of glass fiber, 5% by mass of kaolin, and 5% by mass of cellulose acetate were added, and kneaded with a kneader. The obtained kneaded product was extruded using a screw-backed vacuum extruder equipped with a honeycomb-shaped extrusion nozzle. The obtained honeycomb shaped molded catalyst was dried at 80° C. and fired at 500° C. for 5 hours to obtain a catalyst.

In Test Example 2, 3% by mass of glass fiber, 5% by mass of kaolin, 5% by mass of cellulose acetate, and 10% by volume of ammonia water were added to the same carrier raw material as in Test Example 1, and kneaded with a kneader. The obtained kneaded product was extruded into a honeycomb shape. The obtained molded catalyst was impregnated with water by immersing it in a barium acetate solution (4% by mass in terms of barium oxide with respect to the catalyst). The impregnated molded catalyst was dried under the condition of 80° C., and fired at 500° C. for 5 hours to obtain a catalyst.

1.2. X-Ray Fluorescence Analysis I

The catalysts of Test Examples 1 and 2 were subjected to semi-quantitative analysis by X-ray fluorescence analysis (XRF). The semi-quantitative values were calculated from the obtained X-ray fluorescent spectrum using the FP (fundamental parameter) method. The results are shown in Table 1.

TABLE 1

Semi-quantitative analysis result and composition ratio

|  |  | Test Example 1 | Test Example 2 |
|---|---|---|---|
| % by mass (mol) | $SO_3$ | 3.1 (0.0387) | 1.0 (0.0125) |
|  | BaO | 2.8 (0.0183) | 4.0 (0.0261) |
| Molar ratio ($SO_3$/BaO) |  | 2.1 | 0.48 |

As shown in Table 1, the molar ratio of the composition of $SO_3$ to the composition of BaO in Test Example 1 was 2.1, and the molar ratio of $SO_3$ to BaO in Test Example 2 was 0.48. From the results, in Test Example 1, since the molar ratio of $SO_3$ to BaO was greater than 1.0, it can be inferred that barium compounds such as barium sulfate were sufficiently formed, and that barium compounds such as barium sulfate were insufficiently formed in Test Example 2.

1.3. Measurement of COS Conversion Rate

The catalysts of Test Example 1 and Test Example 2 were subjected to passing of the gas under predetermined conditions, thereby performing hydrolysis reaction of COS. The pressure was the absolute pressure calculated from the value measured by a pressure gauge. Table 2 below shows the test conditions. The COS concentration at the catalyst outlet at each processing temperature was measured by gas chromatography equipped with an FPD detector. As represented by the following formula, the COS conversion rate was determined from the COS concentration (COS concentration at the catalyst inlet) and the COS concentration at the catalyst inlet in Table 2 below. The results are shown in FIG. 1.

$$\text{COS CONVERSION RATE (\%)} = (1 - \text{COS CONCENTRATION AT CATALYST OUTLET}/\text{COS CONCENTRATION AT CATALYST INLET}) \times 100 \quad [\text{Math. 1}]$$

TABLE 2

| Test conditions | | |
|---|---|---|
| AV ($Nm^3/m^2/hr$) | | 36.1 |
| Temperature (° C.) | | 300 |
| Pressure (MPa) | | 0.9 |
| Gas properties | $H_2$ (vol %) | 12.8 |
|  | CO (vol %) | 28.4 |
|  | $CO_2$ (vol %) | 4.3 |
|  | COS (ppm) | 140 |
|  | $H_2S$ (ppm) | 870 |
|  | $O_2$ (ppm) | 40 |
|  | $H_2O$ (vol %) | 3.2 |
|  | $N_2$ (vol %) | 51.3 |

Figure 2:
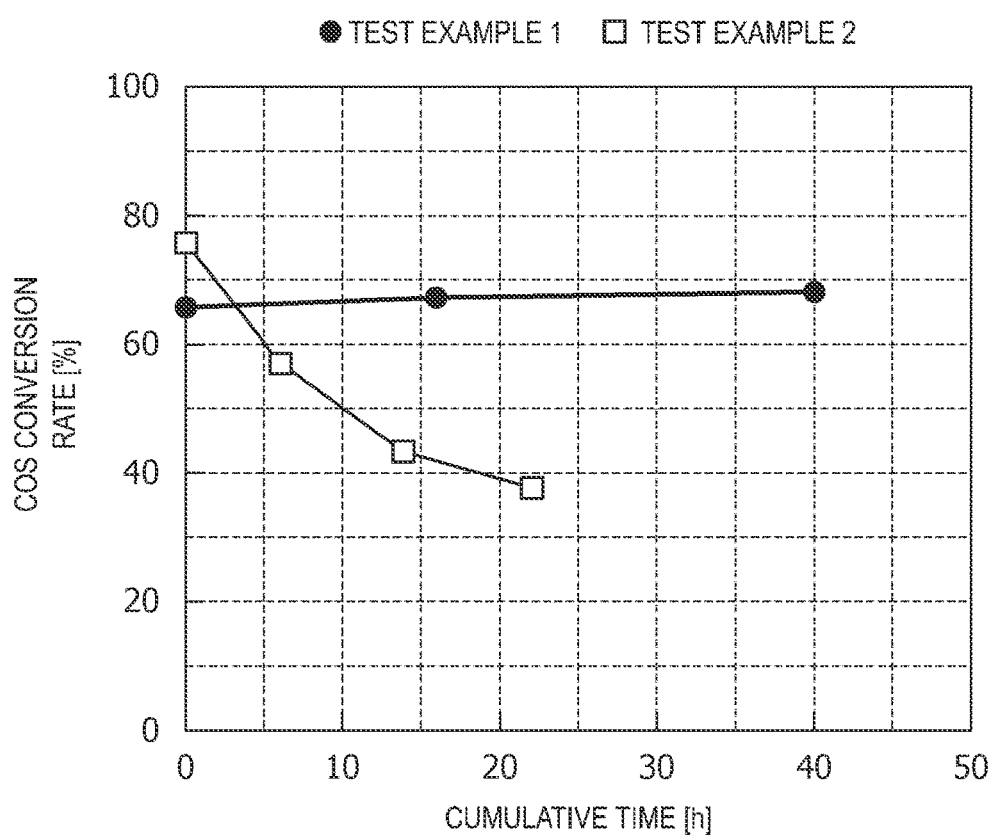
FIG. 2 is a graph indicating the results of the COS conversion rate with respect to the processing temperature in Examples as for the catalyst for hydrolyzing carbonyl sulfide according to the present invention and the method of producing the same.

As shown in FIG. 2, the catalyst of Test Example 1 had a COS conversion rate of about 67% immediately after the start of the test gas passing, a COS conversion rate of about 68% after 16 hours of passing, and a COS conversion of about 69% after 40 hours of passing. On the other hand, the catalyst of Test Example 2 had a COS conversion rate of about 78% immediately after the start of the test gas passing, a COS conversion rate of about 57% after 6 hours of passing, and a 43% COS conversion rate after 14 hours of passing, and a COS conversion rate of about 37% after 22 hours of passing.

From the results, in the catalyst of Test Example 1, as compared with the COS conversion rate immediately after the start of the test gas passing, it was found that the COS conversion rate after 16 hours of passing increased by about 1%, and the COS conversion increased by about 3% after 40 hours of passing. On the other hand, in the catalyst of Test Example 2, as compared with the COS conversion rate immediately after the start of the test gas flow, it was fond that the COS conversion rate after 6 hours of passing decreased by about 27%, the COS conversion rate after 14 hours of passing decreased by about 45%, and the COS conversion rate after 22 hours of passing decreased by about 53%.

1.4. X-Ray Fluorescence Analysis II

For the catalyst of Test Example 2, the above-described gas was passed for an additional 2 hours. A catalyst through which a gas at 300° C. was passed for 24 hours was used as the catalyst of Test Example 3. The catalyst of Test Example 3 was subjected to semi-quantitative analysis by X-ray fluorescence analysis in the same manner as described above. The results are shown in Table 3.

TABLE 3

Semi-quantitative analysis result and composition ratio

|  |  | Test Example 2 | Test Example 3 |
|---|---|---|---|
| % by mass (mol) | $SO_3$ | 1.0 (0.0125) | 2.5 (0.0312) |
|  | BaO | 4.0 (0.0261) | 3.7 (0.0241) |
| Molar ratio ($SO_3$/BaO) |  | 0.48 | 1.3 |

As shown in Table 3, for the catalyst of Test Example 3, the molar ratio of $SO_3$ to BaO was 1.3. From the results, in Test Example 3 after passing a gas at 300° C. for 24 hours through the catalyst of Test Example 2, it was found that the molar ratio of $SO_3$ to BaO increased from 0.48 to 1.3. It is considered that such an increase was caused by the adsorption of $H_2S$ in the processing gas on the catalyst during passing the test gas, or generation of an S-containing compound by the reaction with COS or $H_2S$ in the processing gas. However, it can be inferred that the COS conversion rate decreased due to, for example, changes in the state of the catalyst.

Industrial Applicability

The catalyst for COS hydrolysis and the method of producing the same according to the present invention can provide a catalyst for COS hydrolysis capable of maintaining a high COS conversion rate even after long use.

REFERENCE SIGNS LIST

10 Gasification device
20 COS conversion device
20a Thermometer
30 Washing device
40 $H_2S$ removal device
50 Gas turbine

The invention claimed is:

1. A catalyst for COS hydrolysis comprising:
a titanium dioxide carrier;
a barium compound supported on the titanium dioxide carrier; and
sulfate ions supported on the titanium dioxide carrier;
wherein, a Ba content and a S content in the catalyst are expressed in terms of BaO and $SO_3$, respectively, and a molar ratio of $SO_3$ to BaO in compounds supported on the titanium dioxide carrier of the catalyst is at least 2.1, and
wherein the catalyst converts COS and $H_2O$ in a raw material gas to $CO_2$ and $H_2S$.

2. The catalyst for COS hydrolysis according to claim 1, wherein the barium compound is supported on the titanium dioxide carrier in an amount of 2% by mass or greater and 8% by mass or less in terms of the barium oxide with respect to the catalyst.

3. A method of producing a catalyst for converting COS and $H_2O$ in a raw material gas to $CO_2$ and $H_2S$ by COS hydrolysis, comprising:
adding a barium acetate solution to titanium dioxide containing a sulfate ion and performing kneading to obtain a kneaded product;
extruding the kneaded product to obtain a molded catalyst;
drying the molded catalyst; and
calcining subsequent to the drying to obtain a catalyst of a titanium dioxide carrier supporting a barium compound and a sulfate ion,
wherein, a Ba content and a S content in the catalyst are expressed in terms of BaO and $SO_3$, respectively, and a molar ratio of $SO_3$ to BaO in compounds supported on the titanium dioxide carrier of the catalyst is at least 2.1.

4. The method according to claim 3, wherein in the kneading to obtain the kneaded product, the barium acetate solution is added in an amount of 2% by mass or more and 8% by mass or less in terms of the barium oxide with respect to the catalyst.

* * * * *